United States Patent
Suzuki et al.

(10) Patent No.: US 10,143,968 B2
(45) Date of Patent: Dec. 4, 2018

(54) EXHAUST GAS PURIFYING CATALYST

(71) Applicants: Hiromasa Suzuki, Toyota (JP); Takeru Yoshida, Miyoshi (JP); Masahide Miura, Toyota (JP); Isao Chinzei, Toyota (JP); Mitsuyoshi Okada, Toyota (JP); Toshitaka Tanabe, Nagakute (JP); Akihiko Suda, Nagakute (JP); Hirotaka Ori, Kakgawa (JP); Akiya Chiba, Shizuoka (JP); Kosuke Iizuka, Kakegawa (JP); Akira Morikawa, Nagakute (JP)

(72) Inventors: Hiromasa Suzuki, Toyota (JP); Takeru Yoshida, Miyoshi (JP); Masahide Miura, Toyota (JP); Isao Chinzei, Toyota (JP); Mitsuyoshi Okada, Toyota (JP); Toshitaka Tanabe, Nagakute (JP); Akihiko Suda, Nagakute (JP); Hirotaka Ori, Kakgawa (JP); Akiya Chiba, Shizuoka (JP); Kosuke Iizuka, Kakegawa (JP); Akira Morikawa, Nagakute (JP)

(73) Assignees: TOYOTA JIDOSHA KABUSHIKI KAISHA, Toyota-shi, Aichi (JP); CATALER CORPORATION, Kakegawa-shi, Shizuoka (JP)

( * ) Notice: Subject to any disclaimer, the term of this patent is extended or adjusted under 35 U.S.C. 154(b) by 0 days.

(21) Appl. No.: 15/534,805

(22) PCT Filed: Dec. 11, 2015

(86) PCT No.: PCT/JP2015/006204
§ 371 (c)(1),
(2) Date: Jun. 9, 2017

(87) PCT Pub. No.: WO2016/092863
PCT Pub. Date: Jun. 16, 2016

(65) Prior Publication Data
US 2018/0264409 A1    Sep. 20, 2018

(30) Foreign Application Priority Data
Dec. 12, 2014    (JP) .................................. 2014-251980

(51) Int. Cl.
*B01J 23/38* (2006.01)
*B01J 23/40* (2006.01)
(Continued)

(52) U.S. Cl.
CPC ........ *B01D 53/945* (2013.01); *B01J 37/0244* (2013.01); *B01J 37/038* (2013.01);
(Continued)

(58) Field of Classification Search
CPC ... B01J 23/38; B01J 23/40; B01J 23/42; B01J 23/44; B01J 23/464; B01J 23/63;
(Continued)

(56) References Cited

U.S. PATENT DOCUMENTS

| | | | |
|---|---|---|---|
| 8,835,349 B2* | 9/2014 | Nobukawa | F01N 3/0807 423/213.2 |
| 2003/0050189 A1* | 3/2003 | Morikawa | B01J 23/10 502/304 |

(Continued)

FOREIGN PATENT DOCUMENTS

| | | |
|---|---|---|
| EP | 2 671 638 A1 | 12/2013 |
| JP | 2009-285604 A | 12/2009 |

(Continued)

*Primary Examiner* — Timothy C Vanoy
(74) *Attorney, Agent, or Firm* — Sughrue Mion, PLLC (57) ABSTRACT

The object of the present invention is to provide a high-performance exhaust gas purifying catalyst that can achieve oxygen absorption/release capacity and NOx purification performance. The object is solved by an exhaust gas puri- (Continued)

fying catalyst, which comprises a ceria-zirconia composite oxide having a pyrochlore-type ordered array structure in the upstream part of the catalyst coating layer, in which the ceria-zirconia composite oxide contains at least one additional element selected from the group consisting of praseodymium, lanthanum, and yttrium at 0.5 to 5.0 mol % of the total cation amount, and has a molar ratio of (cerium+the additional element):(zirconium) of 43:57 to 48:52.

4 Claims, 4 Drawing Sheets

(51) Int. Cl.
    *B01J 23/42*     (2006.01)
    *B01J 23/44*     (2006.01)
    *B01J 23/63*     (2006.01)
    *B01J 23/10*     (2006.01)
    *B01J 35/00*     (2006.01)
    *B01D 53/94*     (2006.01)
    *B01J 37/02*     (2006.01)
    *B01J 37/03*     (2006.01)
    *C04B 35/488*     (2006.01)

(52) U.S. Cl.
    CPC .... *C04B 35/488* (2013.01); *C04B 2235/3229* (2013.01); *C04B 2235/443* (2013.01); *C04B 2235/76* (2013.01)

(58) Field of Classification Search
CPC ..... B01J 23/10; B01J 35/0006; F01N 3/0864; F01N 2510/068; F01N 2570/16
See application file for complete search history.

(56) References Cited

U.S. PATENT DOCUMENTS

| | | |
|---|---|---|
| 2010/0061903 A1 | 3/2010 | Kohara et al. |
| 2011/0020201 A1 | 1/2011 | Luo et al. |
| 2012/0021899 A1 | 1/2012 | Nobukawa et al. |
| 2013/0029840 A1 | 1/2013 | Morikawa et al. |
| 2013/0310248 A1 | 11/2013 | Aoki et al. |

FOREIGN PATENT DOCUMENTS

| | | |
|---|---|---|
| JP | 2010-201284 A | 9/2010 |
| JP | 2012-024701 A | 2/2012 |
| WO | 2009/144568 A1 | 12/2009 |
| WO | 2010/001226 A1 | 1/2010 |
| WO | 2012/052828 A1 | 4/2012 |
| WO | 2012/101505 A1 | 8/2012 |
| WO | 2014/199219 A1 | 12/2014 |
| WO | 2015/019156 A1 | 2/2015 |
| WO | 2015/049575 A1 | 4/2015 |

* cited by examiner

EXHAUST GAS PURIFYING CATALYST

CROSS REFERENCE TO RELATED APPLICATIONS

This Application is a National Stage of International Application No. PCT/JP2015/006204 filed Dec. 11, 2015, claiming priority based on Japanese Patent Application No. 2014-251980 filed Dec. 12, 2014, the contents of all of which are incorporated herein by reference in their entirety.

TECHNICAL FIELD

The present invention relates to an exhaust gas purifying catalyst. More specifically, the present invention relates to an exhaust gas purifying catalyst, in which an upstream part of a catalyst coating of an exhaust gas contains a pyrochlore-type ceria-zirconia composite oxide comprising a predetermined additional element.

BACKGROUND ART

Exhaust gas discharged from internal combustion engines such as vehicle engines contains hazardous gases such as carbon monoxide (CO), nitrogen oxides (NOx), and unburned hydrocarbon (HC). An exhaust gas purifying catalyst (i.e., so-called three-way catalyst) capable of decomposing such hazardous gas contains, as a co-catalyst having oxygen storage capacity (OSC), a ceria-zirconia composite oxide or the like. A material having oxygen storage capacity (OSC material) has an effect of suppressing decrease in purification rate due to variation in the exhaust gas composition by absorbing/releasing oxygen and thereby controlling the air-fuel ratio (A/F) in a micro space.

In order to improve purification performance of an exhaust gas purifying catalyst, an OSC material is required to have a desirable oxygen absorption/release rate to respond to a sudden atmosphere change due to variation in A/F ratio and desirable oxygen storage capacity to maintain oxygen absorption/release capacity for a long period of time. In response to such requirements, for example, Patent Literature 1 suggests an exhaust gas purifying catalyst which exerts a high NOx purifying ability even after a duration test, which comprises a first oxygen storage material on which no noble metal is supported and which has a pyrochlore phase type ordered array structure; and a second oxygen storage material which has a higher oxygen storage rate and a lower oxygen storage capacity than the first oxygen storage material, wherein a platinum group noble metal is supported on the second oxygen storage material.

Meanwhile, for example, a catalyst having two catalyst layers (i.e., upper and lower layers) that separately contain Pt and Rh, respectively, has been suggested in view of problematic deterioration of catalyst activity due to solid solution formation of metals in a NOx storage-reduction exhaust purification catalyst that stores NOx in lean atmosphere in which oxygen excess, and releases the stored NOx by changing the exhaust gas atmosphere into stoichiometric or rich atmosphere in which reducible components excess, and purifies NOx by reacting it with reducible components such as HC and CO by the effect of noble metals for reduction (Patent Literature 2 and 3).

CITATION LIST

Patent Literature
{PTL 1}
JP Patent Publication (Kokai) No. 2012-024701 A
{PTL 2}
JP Patent Publication (Kokai) No. 2010-201284 A
{PTL 3}
JP Patent Publication (Kokai) No. 2009-285604 A

SUMMARY OF INVENTION

Technical Problem

A dual catalyst system combining a start-up catalyst (S/C, also referred to as a start-up converter) and an under-floor catalyst (UF/C, also referred to as an under-floor converter or underfloor catalyst) has been widely used in recent years. In such dual catalyst system, S/C is installed close to an internal combustion engine and thus exposed to exhaust gas at high temperatures. Meanwhile, since UF/C is provided downstream of S/C in which the concentration of incoming exhaust gas is small and the temperature thereof is relatively low, a conventional OSC material that requires high temperatures to exert its properties could not sufficiently exert an oxygen absorption/release function. In addition, if S/C becomes unable to sufficiently function due to deterioration or breakdown, UF/C is required to exert sufficient exhaust gas purification ability by itself. Especially in the case of UF/C, oxygen absorption/release capacity and $NO_x$ purification performance are mutually-exclusive events and thus have been difficult to achieve with the use of conventional material. In view of this, the object of the present invention is to provide a high-performance exhaust gas purifying catalyst that can achieve both of oxygen absorption/release capacity and NOx purification performance.

Solution to Problem

As a result of intensive studies in order to achieve the above object, the present inventors found that a high-performance exhaust gas purifying catalyst that can achieve oxygen absorption/release capacity and NOx purification performance can be provided by allowing a part of a catalyst coating on the upstream side of the flow of an exhaust gas to contain a newly developed pyrochlore-type ceria-zirconia composite oxide comprising predetermined additional elements. The present invention is summarized as below.

(1) An exhaust gas purifying catalyst, which comprises a substrate and a catalyst coating layer formed on the substrate, wherein
the catalyst coating layer has: an upstream part occupying from an upstream side end of the exhaust gas purifying catalyst to a length within the range from 40% to 60% of the full length of the substrate; and a downstream part which is the remaining part of the catalyst coating layer; wherein the upstream and downstream parts have different compositions,
the upstream part comprises a carrier, a 1st noble metal catalyst containing at least Pt or Pd that is supported by the carrier, and a ceria-zirconia composite oxide having a pyrochlore-type ordered array, and the downstream part comprises a carrier and a 2nd noble metal catalyst containing at least Rh that is supported by the carrier, wherein
the ceria-zirconia composite oxide contains at least one additional element selected from the group consisting of praseodymium, lanthanum, and yttrium at 0.5 to 5.0 mol % in relation to the total cation amount, and the molar ratio of (cerium+the additional element):(zirconium) is within the range from 43:57 to 48:52.

(2) The exhaust gas purifying catalyst according to (1), wherein the additional element contained in the ceria-zirconia composite oxide is praseodymium.

(3) The exhaust gas purifying catalyst according to (1) or (2), wherein the content of the ceria-zirconia composite oxide in the upstream part is 1 to 20 g/L in relation to the volume of the substrate.

Advantageous Effects of Invention

In the exhaust gas purifying catalyst of the present invention, a pyrochlore-type ceria-zirconia composite oxide comprising a predetermined additional element is contained in an upstream part of the catalyst coating layer. Accordingly, the exhaust gas purifying catalyst of the present invention achieves both of high oxygen absorption/release capacity and NOx purification rate by reducing an atmosphere change within the catalyst and thereby preventing deterioration of Rh contained in a downstream part.

DESCRIPTION OF EMBODIMENTS

The exhaust gas purifying catalyst of the present invention comprises a substrate and a catalyst coating layer formed on the substrate, in which the catalyst coating layer has a part on the upstream side of the flow of an exhaust gas and another part on the downstream side thereof. The both parts have different compositions from each other. The upstream part comprises a ceria-zirconia composite oxide having a pyrochlore type ordered array structure containing at least one additional element selected from the group consisting of praseodymium (Pr), lanthanum (La), and yttrium (Y).

(Ceria-Zirconia Composite Oxide Contained in the Upstream Part of the Catalyst Coating Layer)

In the exhaust gas purifying catalyst of the present invention, the ceria-zirconia composite oxide contained in the upstream part of the catalyst coating layer is characterized in that it has a pyrochlore-type ordered array structure and contains at least one additional element selected from the group consisting of praseodymium, lanthanum, and yttrium at 0.5 to 5.0 mol %, more preferably 1.0 to 3.0 mol % in relation to the total cation amount and the molar ratio of (cerium+additional element):(zirconium) is within the range from 43:57 to 48:52.

The ceria-zirconia composite oxide is a novel OSC material developed by the present inventors. It is characterized in that heat-induced deterioration is suppressed and sufficient oxygen absorption/release capacity can be exerted at temperatures as low as about 400° C. It is further characterized in that the oxygen absorption/release capacity is large while the oxygen absorption/release rate is relatively slow, and both of specific surface area and bulk density are small. Regarding the specific surface area of the ceria-zirconia composite oxide, the BET specific surface area calculated from an adsorption isotherm using the BET isothermal adsorption formula is preferably within the range from 0.1 to 2 m²/g, particularly from 0.2 to 1 m²/g.

In general, the phrase that a ceria-zirconia composite oxide "has a pyrochlore-type ordered array structure" means that a crystal phase having a pyrochlore-type ordered array consisting of cerium ions and zirconium ions (pyrochlore phase) is formed. The array structure of the pyrochlore phase can be identified with the 2θ angle peaks at positions of 14.5°, 28°, 37°, 44.5°, and 51° in an X-ray diffraction pattern obtained with CuKα radiation. The term "peak" used herein refers to a peak having a height from the baseline to the peak top of 30 cps or more. In addition, when the diffraction line intensity is obtained, calculation is performed by subtracting the average diffraction line intensity of θ=10° to 12° as a background from the value of each diffraction line intensity.

In a ceria-zirconia composite oxide having a pyrochlore-type ordered array structure, the content ratio of a crystal phase having a pyrochlore-type ordered array structure, which is calculated from a peak intensity ratio of X-ray diffraction pattern, is preferably 50% or more and particularly 80% or more of the entire crystal phase. Methods for preparing ceria-zirconia composite oxide having a pyrochlore-type ordered array structure are known to those skilled in the art.

The pyrochlore phase of a ceria-zirconia composite oxide ($Ce_2Zr_2O_7$) has oxygen defect sites. When oxygen atoms enter the sites, the pyrochlore phase changes to a κ phase ($Ce_2Zr_2O_8$). Meanwhile, the κ phase can change to a pyrochlore phase by releasing the oxygen atoms. The oxygen storage capacity of a ceria-zirconia composite oxide is due to the mutual phase transition between the pyrochlore phase and the κ phase which causes absorption/release of oxygen.

In X-ray diffraction (XRD) measurement of a crystal phase of a ceria-zirconia composite oxide with CuKα radiation, a diffraction line of 2θ=14.5° is derived from a (111) plane of an ordered phase (κ phase), and a diffraction line of 2θ=29° is overlapping of a diffraction line derived from a (222) plane of an ordered phase and a diffraction line derived from a (111) plane of a ceria-zirconia solid solution having no pyrochlore phase. Therefore, I(14/29) value, that is the intensity ratio of both diffraction lines, can be used as an index demonstrating the abundance ratio of the ordered phase. In addition, since a diffraction line of 2θ=28.5° is derived from a (111) plane of $CeO_2$ itself, I(28/29) value, that is the intensity ratio of the diffraction line of 2θ=28.5° and that of 2θ=29°, can be used as an index demonstrating the degree of phase separation of $CeO_2$ from the composite oxide. Here, based on the PDF card of a κ phase (PDF2: 01-070-4048) and the PDF card of a pyrochlore phase (PDF2:01-075-2694), I(14/29) values of a complete κ phase and a complete pyrochlore phase can be calculated as 0.04 and 0.05, respectively.

The reason why a pyrochlore-type ceria-zirconia composite oxide used in the present invention has the above properties by containing at least one additional element selected from the group consisting of praseodymium, lanthanum, and yttrium is assumed to be as follows. In the case of praseodymium, since $\Delta G$ (Gibbs free energy) of a reduction reaction expressed by the formula: $Pr_6O_{11} \rightarrow 3Pr_2O_3 + O_2$ is negative, a reduction reaction of $CeO_2$ expressed by the formula: $2CeO_2 \rightarrow Ce_2O_3 + 0.5O_2$ whose $\Delta G$ is positive is likely to occur. In the case of lanthanum and yttrium, since they are stable at trivalent state, they stabilize intracrystalline oxygen defects according to the principle of charge compensation.

Regarding durability, a pyrochlore-type ceria-zirconia composite oxide used in the present invention is characterized in that, when heated in the air at 1100° C. for 5 hours, I(14/29) and I(28/29) values obtained by X-ray diffraction measurement with Cu Kα radiation are 0.02 or more and 0.08 or less, respectively.

(Upstream Part of the Catalyst Coating Layer)

The upstream part of the catalyst coating layer of the exhaust gas purifying catalyst of the present invention contains, as a 1st noble metal catalyst, Pt or Pd. A 1st noble metal catalyst may be Pt or Pd only or a mixture of Pt and Pd only. Pt and Pd mainly contribute to oxidation and purification of CO and HC. The 1st noble metal catalyst is supported on a carrier in the upstream part of the catalyst coating layer. Such carrier is not particularly limited. Examples of a carrier that can be used include arbitrary metal oxides used as generally available catalyst carriers which are, for example, alumina ($Al_2O_3$), ceria ($CeO_2$), zirconia ($ZrO_2$), silica ($SiO_2$), titania ($TiO_2$), or any combination thereof. Alumina is preferably used as a carrier for a noble metal catalyst containing Pt or Pd in the upstream part of the catalyst coating layer. An alumina carrier may be a lanthanide-added alumina carrier.

As described above, the upstream part of the catalyst coating layer comprises a ceria-zirconia composite oxide containing at least one additional element selected from the group consisting of praseodymium (Pr), lanthanum (La), and yttrium (Y) and having a pyrochlore-type ordered array structure. In order for the ceria-zirconia composite oxide to sufficiently exert its properties, the ceria-zirconia composite oxide is present in the upstream part of the catalyst coating layer in an amount of preferably 1 g/L or more, particularly preferably 2 g/L or more, and further preferably 3 g/L or more in relation to substrate volume. The ceria-zirconia composite oxide is present in the upstream part of the catalyst coating layer that directly contacts with an exhaust gas that flows into a catalyst. This facilitates the ceria-zirconia composite oxide to exert its properties, thereby increasing the effect of reducing damage to Rh contained in the part on the downstream thereof. In consideration of the balance between the effect and the amount used, the ceria-zirconia composite oxide is preferably present in the upstream part of the catalyst coating layer in an amount of 20 g/L or less, particularly 15 g/L or less, and more particularly 10 g/L or less in relation to substrate volume. Typically, the ceria-zirconia composite oxide is present in the upstream part of the catalyst coating layer in an amount of preferably 1 to 20 g/L in relation to substrate volume.

The upstream part of the catalyst coating layer further comprises, as an OSC material, preferably a ceria-zirconia composite oxide, particularly preferably a ceria-zirconia composite oxide having a larger content of zirconia in relation to ceria (ZC). The expression "a lager content of zirconia in relation to ceria" used herein means that the proportion by weight of zirconia contained in a composite oxide is greater than that of ceria contained in the same. Regarding the abundance ratio, the weight ratio of ceria:zirconia in the ZC material is preferably within the range from 1:1.1 to 1:5, particularly 1:1.5 to 1:3. The ZC material has oxygen absorption/release efficiency greater than that of a CZ material and thus it is less likely to affect noble metal activity.

(Downstream Part of the Catalyst Coating Layer)

The downstream part of the catalyst coating layer of the exhaust gas purifying catalyst of the present invention contains Rh as a 2nd noble metal catalyst, and it may further contain Pt or Pd. A 2nd noble metal catalyst may be Rh only, a mixture of Rh and Pt only, a mixture of Rh and Pd only, or a mixture of Rh, Pt, and Pd only. Rh mainly contributes to reduction and purification of NOx. As in the case of the upstream part, a 2nd noble metal catalyst is supported on a carrier in the downstream part of the catalyst coating layer. Examples of a carrier that can be used include alumina ($Al_2O_3$), zirconia ($ZrO_2$), silica ($SiO_2$), titania ($TiO_2$), and any combination thereof. As a carrier for a 2nd noble metal catalyst containing Rh in the downstream part of the catalyst coating layer, zirconia, which can be easily heated because of its low specific heat, is preferable. In addition, the durability of the catalyst coating layer can be improved by mixing alumina having high thermostability into the catalyst coating layer, in addition to the carrier.

(Substrate and Catalyst Coating)

A substrate used for the exhaust gas purifying catalyst of the present invention is not particularly limited, and a generally used material with a honeycomb structure having many cells can be used for such a substrate. Examples of such material include: ceramics materials having thermostability such as cordierite ($2MgO.2Al_2O_3. 5SiO_2$), alumina, zirconia, and silicon carbide; and metal material in the form of metal foil such as stainless steel. It is possible to form a catalyst coating layer on a substrate by a well-known method comprising, for example, pouring slurry prepared by suspending material(s) in distilled water and a binder into a substrate and blowing an unnecessary portion of sully off using a blower.

Figure 1:
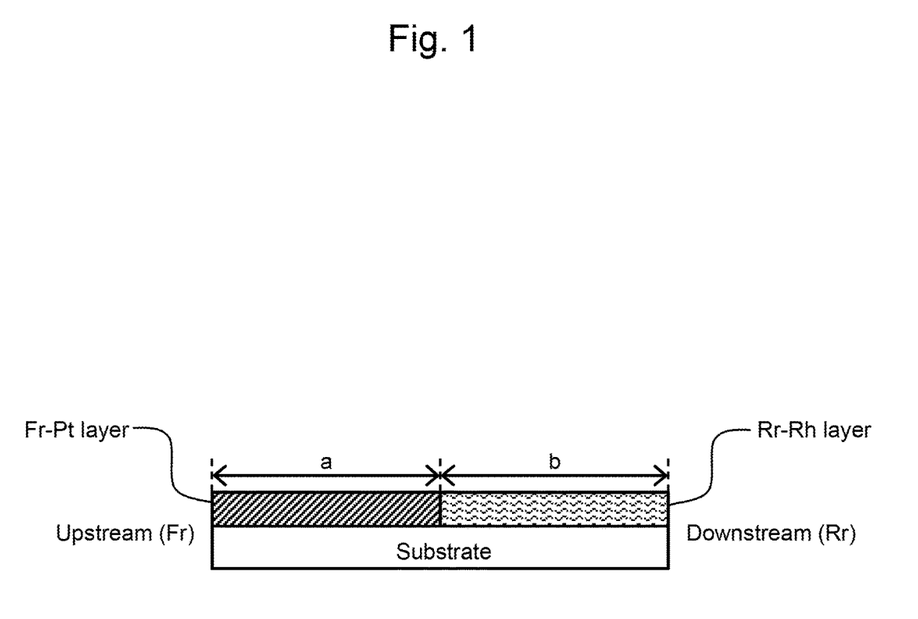
FIG. 1 schematically shows a cross-sectional view of a catalyst coating layer of the exhaust gas purifying catalyst of the present invention in one embodiment.

FIG. 1 schematically shows a cross-sectional view of a catalyst coating layer of the exhaust gas purifying catalyst of the present invention in one embodiment. As stated above, the catalyst coating layer of the exhaust gas purifying catalyst of the present invention is separated in a part on the upstream side of the flow of an exhaust gas and another part on the downstream side thereof, which have different compositions. The upstream part contains a pyrochlore-type ceria-zirconia composite oxide comprising a predetermined additional element as described above. Such ceria-zirconia composite oxide having large oxygen storage capacity reduces a change in atmosphere between rich and lean within the catalyst so as to prevent deterioration of Rh present in the downstream part. Preferably, the upstream part of the catalyst coating layer is formed so as to occupy the part from an upstream side end of the exhaust gas purifying catalyst to a length accounting for 40% to 60%, in particular, 45% to 55% of the full length of the substrate ("a" of FIG. 1), while the downstream part is the remaining part of the catalyst coating layer ("b" of FIG. 1)

(Properties of the Exhaust Gas Purifying Catalyst of the Present Invention)

The exhaust gas purifying catalyst of the present invention is particularly suitable for useas UF/C in a dual catalyst system in which a start-up catalyst (S/C) and an under-floor catalyst (UF/C) are combined. The exhaust gas purifying catalyst of the present invention contains a pyrochlore-type ceria-zirconia composite oxide comprising predetermined additional elements in the upstream part of the catalyst coating layer. Accordingly, the exhaust gas purifying catalyst of the present invention has sufficient oxygen storage capacity even at low temperatures so as to reduce an atmosphere change between rich and lean within the catalyst, thereby preventing deterioration of Rh present in the downstream part. As a result, the exhaust gas purifying catalyst of the present invention can exert high exhaust gas purification performance when it is installed as UF/C.

EXAMPLES

The present invention is explained in more detail with reference to the Examples below. However, the present invention is not limited to the Examples.

1. Preparation of Pr-Added Pyrochlore ZC

First, the following were added to 1217 g of an aqueous solution containing ammonia in an amount 1.2 times the neutralization equivalent to obtain a coprecipitate: 442 g of a cerium nitrate aqueous solution (28% by mass calculated in terms of $CeO_2$), 590 g of a zirconium oxynitrate aqueous solution (18% by mass calculated in terms of $ZrO_2$), 100 g of an aqueous solution containing praseodymium nitrate in an amount corresponding to 1.2 g of $Pr_6O_{11}$, and 197 g of an aqueous solution containing hydrogen peroxide in an amount corresponding to 1.1 times the molar amount of cerium contained. The obtained coprecipitate was centrifuged and washed with ion-exchange water. The resulting coprecipitate was dried at 110° C. for 10 hours or more and sintered at 400° C. for 5 hours in the air. Thus, a solid solution containing cerium, zirconium, and praseodymium (a $CeO_2$—$ZrO_2$—$Pr_6O_{11}$ solid solution) was obtained. The obtained solid solution was pulverized by a pulverizer (product name: Wonder-Blender; AS ONE Corporation) such that they have a particle size equal or less than 75 μm after sieving to obtain aceria-zirconia-praseodymium solid solution powder.

Next, 20 g of the obtained solid solution powder was packed into a polyethylene bag (volume: 0.05 L), the bag was deaerated, and the opening of the bag was heat-sealed. Subsequently, the bag was subjected to cold isostatic pressing (CIP) at a pressure (molding pressure) of 2000 kgf/cm² for 1 minute for molding using a cold isostatic pressing machine (product name: CK4-22-60, Nikkiso Co., Ltd.) to obtain a molded product of the ceria-zirconia-praseodymium solid solution powder. The size and weight of the molded product were as follows: length: 4 cm; width: 4 cm; average thickness: 7 mm; and weight: approximately 20 g.

Next, the obtained molded product (2 sheets) was placed in a crucible filled with 70 g of activated carbon (inner volume: 8 cm in diameter and 7 cm in height). The crucible was closed with a cover and placed in a high-speed heating electric furnace, followed by heating to 1000° C. for a heating-up period of 1 hour and heating to 1700° C. (reduction treatment temperature) for a heating-up period of 4 hours. The temperature was maintained for 5 hours. Then, the temperature was cooled to 1000° C. for a cooling period of 4 hours and then cooled to room temperature by natural heat radiation. The obtained reduction treatment product was heated at 500° C. for 5 hours in the air for oxidation to obtain a praseodymium-added pyrochlore-type ceria-zirconia composite oxide (Pr-added pyrochlore ZC) with a content ratio (molar ratio) of cerium:zirconium:praseodymium of 45:54:1. The obtained Pr-added pyrochlore ZC was pulverized to a particle size of 75 μm or less by sieving.

The obtained Pr-added pyrochlore ZC was heated at 1100° C. for 5 hours in the air (high temperature durability test). Then, in order to confirm whether or not the pyrochlore structure had been maintained, the crystal phase of the treated Pr-added pyrochlore ZC was assayed by X-ray diffraction. An X-ray diffraction apparatus (product name: RINT-2100; Rigaku Corporation) was used to measure X-ray diffraction patterns under the following conditions to obtain I(14/29) and I(28/29) values: CuKα radiation: 40 KV; 30 mA; 2θ=2°/minute.

Samples A to E of Pr-added pyrochlore ZC having different molar ratios of cerium:zirconium: praseodymium were prepared and subjected to high temperature durability tests, and then X-ray diffraction patterns were measured to obtain I(14/29) and I(28/29) values in the manner described above. Table 1 summarizes the results.

TABLE 1

| Pr-added pyrochlore ZC | Cation molar ratio | | | I(14/29) value | I(28/29) value |
|---|---|---|---|---|---|
| | Ce | Zr | Pr | | |
| A | 45 | 54 | 1 | 0.033 | 0.008 |
| B | 43.5 | 54 | 2.5 | 0.037 | 0.007 |
| C | 40.5 | 57 | 2.5 | 0.031 | 0.006 |
| D | 45.5 | 52 | 2.5 | 0.032 | 0.008 |
| E | 41 | 54 | 5 | 0.032 | 0.008 |

2. Preparation of Catalysts (1) Comparative Example 1

Fr—Pt layer(Pt(0.2)/$Al_2O_3$(25)+ZC(30))    (a)

Pt material supported by $Al_2O_3$ (material 1) was prepared using an $Al_2O_3$ carrier containing $La_2O_3$ (1% by mass) and platinum nitrate by an impregnation method. Next, material 1, a ceria-zirconia composite oxide with a molar ratio of cerium:zirconium of 46:54 (ZC) and an $Al_2O_3$ binder were added into distilled water with stirring and suspending to obtain a slurry 1.

Slurry 1 was poured into a honeycomb-structured cordierite substrate for coating the substrate wall surface and then an unnecessary portion of slurry 1 was blown off using a blower. Coating was initiated from the upstream side of the flow of exhaust gas (Fr side) so that a coating was formed over the part whose length from the upstream side end is within 50% of the full length of the substrate (see FIG. 1, a=50%). The coating was controlled such that the contents of material 1 and ZC in the coating become 25 g/L (Pt: 0.2 g/L) and 30 g/L, respectively, in relation to the volume of the substrate. After coating, moisture was removed using a dryer at 120° C. for 2 hours, and the resultant was subjected to sintering at 500° C. in an electric furnace for 2 hours.

Rr-Rh layer(Rh(0.12)/$ZrO_2$(40)+$Al_2O_3$(20))    (b)

Rh/$ZrO_2$ material supported by $ZrO_2$ (material 2) was prepared using a $ZrO_2$ carrier and rhodium nitrate by an impregnation method. Next, material 2, $Al_2O_3$, and an $Al_2O_3$ binder were added into distilled water with stirring and suspending to obtain slurry 2.

Slurry 2 was poured into a honeycomb-structured substrate, in which a coating is formed according to (a) above, and suctioned using a blower for coating the substrate wall surface. Coating was initiated from the downstream side of the flow of exhaust gas (Rr side) so that a coating was formed over the part within 50% of the full length of the substrate (see FIG. 1b=50%). The coating was controlled such that the contents of material 2 and $Al_2O_3$ in the coating become 40 g/L (Rh: 0.12 g/L) and 20 g/L, respectively, in relation to the volume of the substrate. After coating, moisture was removed using a dryer at 120° C. for 2 hours, and the resultant was subjected to sintering at 500° C. in an electric furnace for 2 hours.

(2) Examples 1 to 4

A catalyst was prepared in the manner described in Comparative Example 1 except that Pr-added pyrochlore ZC with a molar ratio of cerium:zirconium:praseodymium of 45:54:1 (Table 1, A) was further added when preparing slurry 1. The contents of Pr-added pyrochlore ZC in a coating were adjusted to 5 g/L, 10 g/L, 15 g/L, and 20 g/L in Examples 1, 2, 3, and 4, respectively in relation to the volume of the substrate.

Table 2 lists the compositions of the catalysts in the Fr—Pt and Rr-Rh layers of Examples 1 to 4 and Comparative Example 1.

TABLE 2

|  | Fr-Pt layer (Pt (0.2)/Al$_2$O$_3$ (25) + ZC (30)) | Rr-Rh layer (Rh (0.12)/ZrO$_2$ (40) + Al$_2$O$_3$ (20)) |
| --- | --- | --- |
| Comparative Example 1 | — | — |
| Example 1 | +Pr-added pyrochlore ZC (5) | — |
| Example 2 | +Pr-added pyrochlore ZC (10) | — |
| Example 3 | +Pr-added pyrochlore ZC (15) | — |
| Example 4 | +Pr-added pyrochlore ZC (20) | — |

3. Evaluation (1) Durability Test

Each catalyst was attached to an exhaust system of a V-type 8-cylinder gasoline engine (4.3 L) and subjected to a 50-hour durability test at a catalyst bed temperature of 950° C. by conditions including switching feedback, fuel-cut, rich, and lean within one minute.

(2) Evaluation of Rh Particle Size

The particle size D90 (i.e., the particle size corresponding to a cumulative mass of 90% in a particle size distribution) of Rh contained in the Rr-Rh layer after the durability test was calculated by a CO pulse adsorption method.

(3) Evaluation of Oxygen Absorption/Release Capacity

Each catalyst subjected to the durability test was installed in an engine. The inlet gas temperature was set to 400° C. The amount of oxygen absorbed/released when A/F ratio of the inlet gas atmosphere was caused to periodically swing between rich and lean regions was measured based on a response delay of an O$_2$ sensor provided on the emission side of the catalyst.

(4) Evaluation of NOx Purification Performance

Each catalyst subjected to the durability test was installed in an engine. The inlet gas temperature was set to 400° C. The amount of NOx emissions when A/F ratio of the inlet gas atmosphere was caused to periodically swing between rich and lean regions was measured.

4. Results

Figure 2:
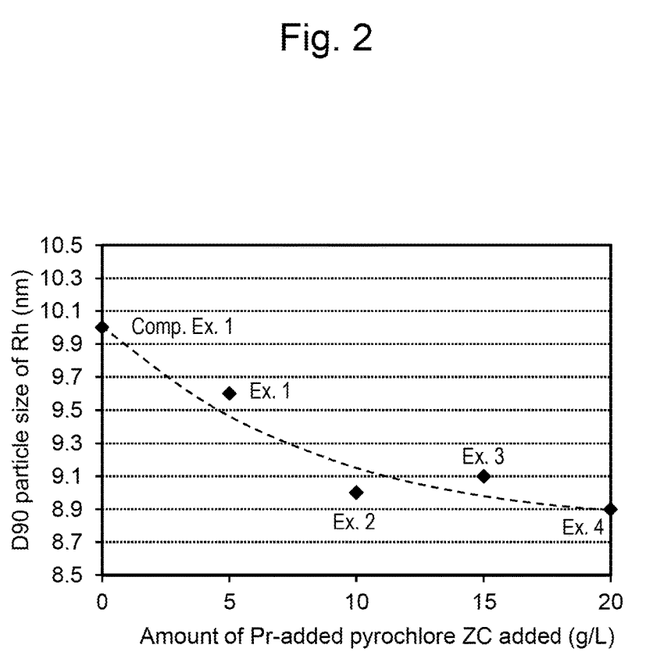
FIG. 2 is a graph showing the relationship between the amount of Pr-added pyrochlore ZC added to an Fr—Pt layer and the D90 particle size of Rh particles in the Rr-Rh layer.

FIG. 2 is a graph showing the relationship between the amount of Pr-added pyrochlore ZC added to the Fr—Pt layer and the D90 particle size of Rh. It is understood that as the amount of Pr-added pyrochlore ZC added increased, the particle size of Rh particles was prevented from increasing.

Figure 3:
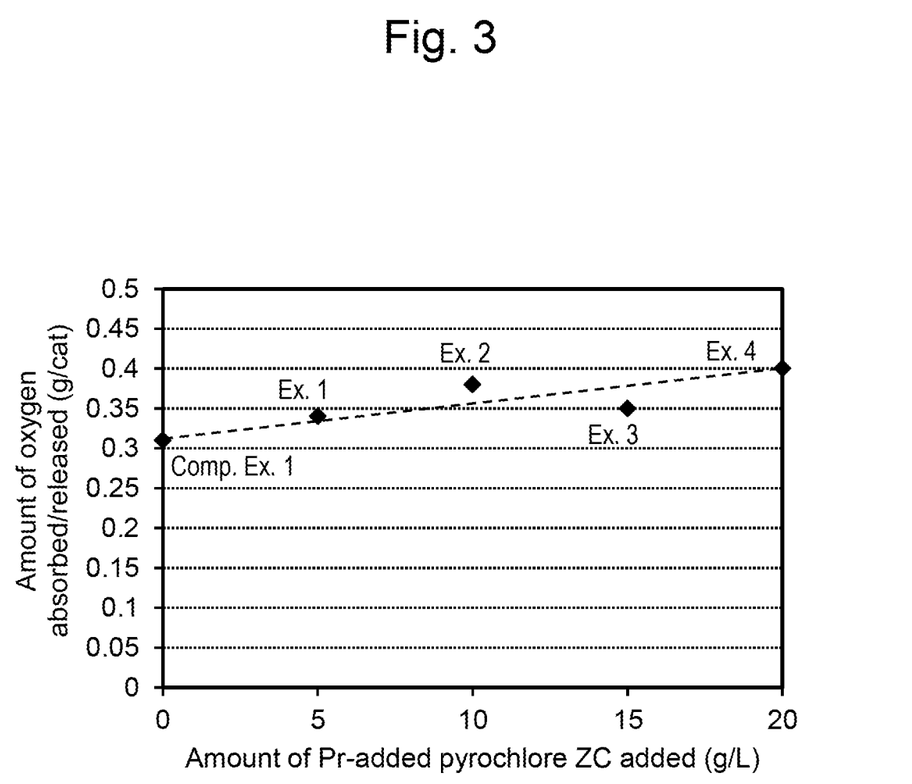
FIG. 3 is a graph showing the relationship between the amount of Pr-added pyrochlore ZC added to an Fr—Pt layer and the amount of oxygen absorbed/released by a catalyst.

FIG. 3 is a graph showing the relationship between the amount of Pr-added pyrochlore ZC added to the Fr—Pt layer and the amount of oxygen absorbed/released by a catalyst. It is understood that as the amount of Pr-added pyrochlore ZC added increased, oxygen absorption/release capacity of the catalyst was improved.

Figure 4:
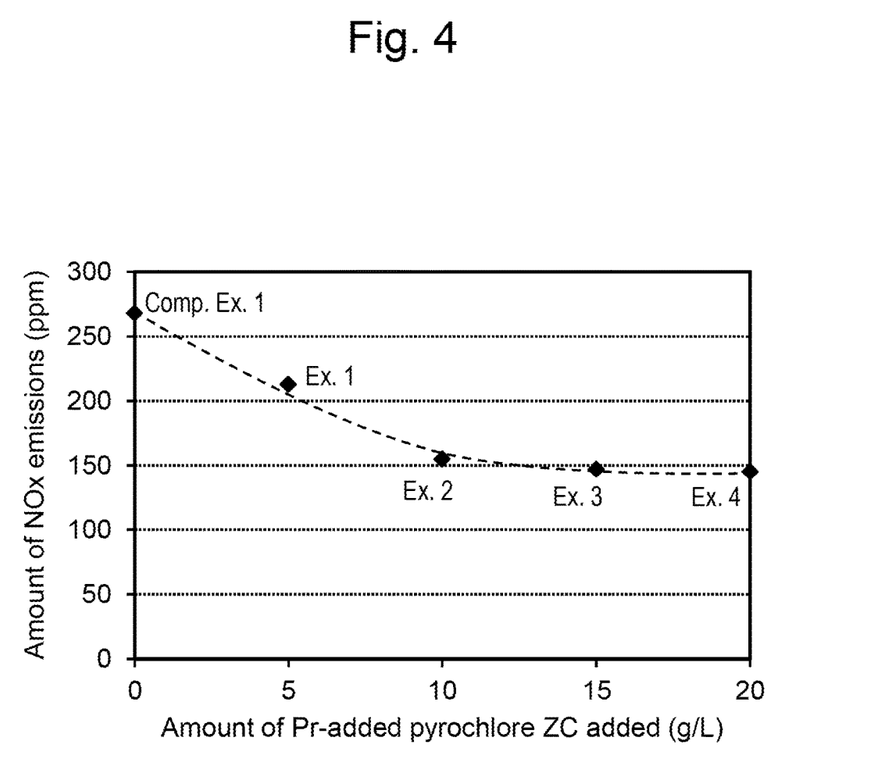
FIG. 4 is a graph showing the relationship between the amount of Pr-added pyrochlore ZC added to an Fr—Pt layer and the amount of NOx emissions from a catalyst.

FIG. 4 is a graph showing the relationship between the amount of Pr-added pyrochlore ZC added to the Fr—Pt layer and the amount of NOx emissions from a catalyst. When the amount of Pr-added pyrochlore ZC added was 10 g/L or less, the amount of NOx emissions significantly decreased, suggesting that this was because of the increase of oxygen absorption/release capacity and suppression of the increase in the particle size of Rh particles.

The invention claimed is:

1. An exhaust gas purifying catalyst, which comprises a substrate and a catalyst coating layer formed on the substrate, wherein
the catalyst coating layer has: an upstream part occupying from an upstream side end of the exhaust gas purifying catalyst to a length within the range from 40% to 60% of the full length of the substrate; and a downstream part which is the remaining part of the catalyst coating layer;
wherein the upstream and downstream parts have different compositions,
the upstream part comprises a carrier, a 1st noble metal catalyst containing at least Pt or Pd that is supported by the carrier, and a ceria-zirconia composite oxide having a pyrochlore-type ordered array, and
the downstream part comprises a carrier and a 2nd noble metal catalyst containing at least Rh that is supported by the carrier, wherein
the ceria-zirconia composite oxide contains at least one additional element selected from the group consisting of praseodymium, lanthanum, and yttrium at 0.5 to 5.0 mol % in relation to the total cation amount, and the molar ratio of (cerium+the additional element):(zirconium) is within the range from 43:57 to 48:52.

2. The exhaust gas purifying catalyst according to claim 1, wherein the additional element contained in the ceria-zirconia composite oxide is praseodymium.

3. The exhaust gas purifying catalyst according to claim 1, wherein the content of the ceria-zirconia composite oxide in the upstream part is 1 to 20 g/L in relation to the volume of the substrate.

4. The exhaust gas purifying catalyst according to claim 2, wherein the content of the ceria-zirconia composite oxide in the upstream part is 1 to 20 g/L in relation to the volume of the substrate.

* * * * *